United States Patent
Fujii et al.

(10) Patent No.: US 9,607,741 B2
(45) Date of Patent: *Mar. 28, 2017

(54) FERRITE PARTICLES FOR BONDED MAGNET, RESIN COMPOSITION FOR BONDED MAGNET AND MOLDED PRODUCTS USING THE SAME

(71) Applicant: TODA KOGYO CORPORATION, Hiroshima-ken (JP)

(72) Inventors: Yasuhiko Fujii, Hiroshima-ken (JP); Minoru Ohsugi, Hiroshima-ken (JP); Yasushi Nishio, Hiroshima-ken (JP); Yosuke Koyama, Hiroshima-ken (JP); Shigeru Takaragi, Hiroshima-ken (JP)

(73) Assignee: TODA KOGYO CORPORATION, Hiroshima (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/256,218

(22) Filed: Apr. 18, 2014

(65) Prior Publication Data

US 2014/0225023 A1    Aug. 14, 2014

Related U.S. Application Data

(62) Division of application No. 12/572,728, filed on Oct. 2, 2009, now Pat. No. 8,741,170.

(51) Int. Cl.
| | |
|---|---|
| H01F 1/08 | (2006.01) |
| H01F 1/113 | (2006.01) |
| C01G 49/00 | (2006.01) |
| H01F 1/01 | (2006.01) |
| C09C 1/22 | (2006.01) |
| H01F 1/42 | (2006.01) |
| H01F 41/02 | (2006.01) |

(52) U.S. Cl.
CPC ........... *H01F 1/01* (2013.01); *C01G 49/0036* (2013.01); *C09C 1/22* (2013.01); *H01F 1/113* (2013.01); *H01F 1/42* (2013.01); *C01P 2002/52* (2013.01); *C01P 2006/10* (2013.01); *C01P 2006/12* (2013.01); *C01P 2006/42* (2013.01); *H01F 41/0273* (2013.01); *Y10T 428/2982* (2015.01)

(58) Field of Classification Search
CPC . H01F 1/083; H01F 1/113; H01F 1/01; H01F 1/42; H01F 41/16; C01G 49/0036; C01G 49/009; C04B 2235/3274; C04B 2235/5436; C04B 35/2633; C04B 35/6262; C01P 2006/42; C01P 2004/61; Y10T 428/2982; Y10T 428/24893; C09C 1/22
USPC ................ 252/62.54, 62.51 R, 62.63, 62.62; 428/402
See application file for complete search history.

(56) References Cited

U.S. PATENT DOCUMENTS

| | | | | |
|---|---|---|---|---|
| 3,036,008 | A * | 5/1962 | Godshalk | C04B 35/016 252/62.63 |
| 5,578,670 | A | 11/1996 | Nakazawa et al. | |
| 6,383,407 | B2 * | 5/2002 | Ogata | C01G 49/0054 252/62.54 |
| 6,511,733 | B2 | 1/2003 | Hayashi et al. | |
| 6,872,325 | B2 | 3/2005 | Bandyopadhyay et al. | |
| 8,741,170 | B2 * | 6/2014 | Fujii | C01G 49/0036 252/62.54 |
| 2002/0084001 | A1 | 7/2002 | Iwasaki et al. | |
| 2004/0028592 | A1 * | 2/2004 | Akimoto | C01B 13/18 423/263 |
| 2004/0094742 | A1 | 5/2004 | Kawano et al. | |
| 2004/0241394 | A1 | 12/2004 | Burrows | |
| 2006/0284136 | A1 | 12/2006 | Takami et al. | |
| 2009/0218540 | A1 | 9/2009 | Takami et al. | |
| 2010/0028796 | A1 | 2/2010 | Nakamura et al. | |
| 2010/0124644 | A1 | 5/2010 | Hein et al. | |
| 2010/0295643 | A1 * | 11/2010 | Nakaue | C01G 49/009 335/297 |
| 2015/0041702 | A1 * | 2/2015 | Nishio | H01F 1/113 252/62.54 |

FOREIGN PATENT DOCUMENTS

| | | |
|---|---|---|
| CN | 101345110 | 1/2009 |
| DE | 40 41 962 | 6/1992 |
| EP | 1 090884 | 4/2001 |
| EP | 1 170 757 | 1/2002 |
| EP | 1981044 A2 | 10/2008 |
| JP | 5-144622 | 6/1993 |
| JP | 06163237 A | 6/1994 |
| JP | 6-244047 | 9/1994 |
| JP | 2001-028305 | 1/2001 |

(Continued)

OTHER PUBLICATIONS

Office Action and English language translation of Office Action in JP 2008-088151 mailed May 9, 2012.

(Continued)

*Primary Examiner* — Matthew E Hoban
*Assistant Examiner* — Lynne Edmondson
(74) *Attorney, Agent, or Firm* — Nixon & Vanderhye P.C.

(57) ABSTRACT

The present invention relates to ferrite particles for bonded magnet, having a volume-average particle diameter of 2.1 to 2.7 μm and a particle diameter ×90 of 4.3 to 5.4 μm wherein the ×90 represents a particle diameter at which a cumulative percentage of particles under sieve (undersize particles) based on a volume thereof is 90%, when determined from a particle size distribution thereof measured by using a laser diffraction type particle size distribution measuring apparatus.

2 Claims, No Drawings

(56) References Cited

FOREIGN PATENT DOCUMENTS

| | | | | |
|---|---|---|---|---|
| JP | EP 1981044 | A2 * | 10/2008 | ......... C01G 49/0036 |
| JP | 2008-88151 | | 11/2008 | |
| JP | WO 2009041606 | A1 * | 4/2009 | ......... C01G 49/0018 |
| KR | 2008-0089226 | | 10/2008 | |

OTHER PUBLICATIONS

JP 06163237 A (machine translation).
European Search Report for EP Application No. 08 25 1141 dated Oct. 7, 2008.

* cited by examiner

FERRITE PARTICLES FOR BONDED MAGNET, RESIN COMPOSITION FOR BONDED MAGNET AND MOLDED PRODUCTS USING THE SAME

This application is a divisional of application Ser. No. 12/572,728 filed Oct. 2, 2009, now U.S. Pat. No. 8,741,170 B2, the entire contents of which is hereby incorporated by reference in this application.

BACKGROUND OF THE INVENTION

As well known in the art, bonded magnets have many advantages such as light weight, good dimensional accuracy, facilitated moldability into even a complicated shape as well as good mass-production capability as compared to sintered magnets, and, therefore, have been extensively used in various applications such as toys, office equipments, audio equipments and motors.

As the magnetic particles usable in the bonded magnets, there are known rare earth element magnet particles such as typically Nd—Fe—B-based alloy particles, or ferrite particles. The rare earth element magnet particles have high magnetic properties, but are expensive, resulting in limited applications thereof. On the other hand, the ferrite particles are deteriorated in magnetic properties as compared to the rare earth element magnet particles, but are inexpensive and chemically stable and, therefore, have been used in more extensive applications.

The bonded magnets have been usually produced by kneading a rubber or a plastic material with magnetic particles and then molding the resultant kneaded material in a magnetic field or by using a mechanical means.

In recent years, with the increase in performance of various materials or equipments including an enhanced reliability thereof, there is also a demand for enhancing a performance of the bonded magnets including enhancement in strength and magnetic properties thereof.

More specifically, it has been demanded that a molded product of the bonded magnet obtained by an injection molding method, etc., exhibits a mechanical strength capable of withstanding severe conditions when used in various applications.

For example, in copying machines, printers or the like using a magnet roll, since the magnet roll is used at a high speed in these equipments with a long service life which are improved in light weight, thin thickness and reduction in size, it has been strongly demanded that the magnet roll exhibits a high mechanical strength. In addition, as to the magnetic properties of the magnet roll, it has been demanded to achieve, in particular, not only increase in a surface magnetic force of the magnet roll, but also uniformity in the surface magnetic force as important technical factors for obtaining clear images in the copying machines or printers.

For this reason, ferrite particles used in the bonded magnets as well as resin compositions for the bonded magnets which are composed of the ferrite particles and an organic binder are also required to satisfy the above requirements.

Conventionally, there have been made various improvements in the ferrite particles for bonded magnet and the resin compositions for bonded magnet composed of the ferrite particles and the organic binder. For example, there are known the method of producing ferrite particles by using an alkali metal compound or an alkali earth metal compound as a flux (Japanese Patent Application Laid-open (KOKAI) No. 55-145303 (1980)); the method of controlling a particle size distribution of ferrite particles (Japanese Patent Application Laid-open (KOKAI) No. 3-218606 (1991)); the method of mixing two or more kinds of ferrite particles which are different in particle diameter from each other (Japanese Patent Application Laid-open (KOKAI) No. 4-224116 (1992)); and the method of applying an impact force to ferrite particles in a high-speed flow thereof (Japanese Patent Application Laid-open (KOKAI) No. 8-037106 (1996)).

At the present time, the ferrite particles for bonded magnet and/or the resin compositions for bonded magnet which are capable of satisfying the above requirements have been strongly required. However, the ferrite particles and/or resin compositions capable of satisfying the requirements to a sufficient extent have not been obtained until now.

That is, the bonded magnet molded products produced by using the ferrite particles or resin compositions for bonded magnet as described in the above Patent Documents have failed to exhibit all of high magnetic force, uniformity in magnetic force, excellent magnetic strength.

SUMMARY OF THE INVENTION

An object or a technical task of the present invention is to provide ferrite particles for bonded magnet and a resin composition for bonded magnet which are capable of producing a bonded magnet exhibiting a high magnetic force, a good uniformity in magnetic force and an excellent mechanical strength.

The object or technical task of the present invention can be achieved by the present invention as described below.

That is, in a first aspect of the present invention, there is provided ferrite particles for bonded magnet, having a volume-average particle diameter of 2.1 to 2.7 µm and a particle diameter ×90 of 4.3 to 5.4 µm wherein the ×90 represents a particle diameter at which a cumulative percentage of particles under sieve (undersize particles) based on a volume thereof is 90%, when determined from a particle size distribution thereof measured by using a laser diffraction type particle size distribution measuring apparatus (invention 1).

In a second aspect of the present invention, there is also provided ferrite particles for bonded magnet as defined in the above invention 1, wherein the ferrite particles have a standard deviation σ of particle size distribution of 1.4 to 1.9 when determined from a particle size distribution thereof measured by using a laser diffraction type particle size distribution measuring apparatus (invention 2).

In a third aspect of the present invention, there is also provided a resin composition for bonded magnet which comprises 85 to 93% by weight of the ferrite particles for bonded magnet as defined in the above invention 1 or 2, and 7 to 15% by weight of an organic binder component (invention 3).

In a fourth aspect of the present invention, there is also provided a molded product formed from any one of the ferrite particles for bonded magnet as defined in the above invention 1 or 2, and the resin composition for bonded magnet as defined in the above invention 3 (invention 4).

In a fifth aspect of the present invention, there is also provided a molded product as defined in the above invention 4, wherein the molded product is a magnet roll (invention 5).

DETAILED DESCRIPTION OF THE INVENTION

The present invention is described in detail below.

First, the ferrite particles for bonded magnet according to the present invention (hereinafter referred to merely as "ferrite particles") are explained.

The composition of the ferrite particles according to the present invention is not particularly limited, and may be either Sr-based ferrite particles or Ba-based ferrite particles. In addition, the ferrite particles according to the present invention may also contain different kinds of elements such as La, Nd, Pr, Co and Zn.

The ferrite particles according to the present invention have a volume-average particle diameter of 2.10 to 2.70 μm when determined from a particle size distribution thereof measured by using a laser diffraction type particle size distribution measuring apparatus. When the volume-average particle diameter of the ferrite particles is less than 2.10 μm, the molding product produced therefrom tends to exhibit a low surface magnetic force, resulting in deteriorated uniformity of the surface magnetic force. When the volume-average particle diameter of the ferrite particles is more than 2.70 μm, the molded product produced therefrom tends to be deteriorated in uniformity of the surface magnetic force. The volume-average particle diameter of the ferrite particles is preferably 2.20 to 2.70 μm.

The ferrite particles according to the present invention have a standard deviation σ of particle size distribution of 1.40 to 1.90 when determined from a particle size distribution thereof measured by using a laser diffraction type particle size distribution measuring apparatus. When the standard deviation of the ferrite particles is less than 1.40, the molded product produced therefrom tends to exhibit a low surface magnetic force, resulting in deteriorated uniformity of the surface magnetic force. When the standard deviation of the ferrite particles is more than 1.90, the molded product produced therefrom tends to be deteriorated in uniformity of the surface magnetic force. The standard deviation σ of particle size distribution of the ferrite particles is preferably 1.45 to 1.90.

The ferrite particles according to the present invention have a particle diameter ×90 of 4.30 to 5.40 μm wherein the ×90 represents a particle diameter at which a cumulative percentage of particles under sieve (undersize particles) based on a volume thereof is 90%, when determined from a particle size distribution thereof measured by using a laser diffraction type particle size distribution measuring apparatus. When the particle diameter ×90 of the ferrite particles is less than 4.30 μm, the bonded magnet molded product (magnet roll) obtained therefrom tends to be undesirably reduced in surface magnetic force. When the particle diameter ×90 of the ferrite particles is more than 5.40 μm, the molded product obtained therefrom tends to be deteriorated in uniformity of the surface magnetic force. The particle diameter ×90 of the ferrite particles is preferably 4.40 to 5.35 μm.

The ferrite particles according to the present invention preferably have a BET specific surface area value of 1.4 to 2.0 m$^2$/g.

The ferrite particles according to the present invention preferably have a compressed density (CD) of 3300 kg/m$^3$ (3.30 g/cm$^3$) to 3500 kg/m$^3$ (3.50 g/cm$^3$). When the compressed density of the ferrite particles is less than 3300 kg/m$^3$ (3.30 g/cm$^3$), the filling (packing) property of the ferrite particles tends to be lowered, thereby failing to obtain a bonded magnet capable of exhibiting high magnetic properties. When the compressed density of the ferrite particles is more than 3500 kg/m$^3$ (3.50 g/cm$^3$), the molded product obtained therefrom tends to be deteriorated in uniformity of surface magnetic force. The compressed density of the ferrite particles is more preferably 3320 kg/m$^3$ (3.32 g/cm$^3$) to 3480 kg/m$^3$ (3.48 g/cm$^3$).

The ferrite particles according to the present invention preferably have a residual magnetic flux density Br of not less than 150 mT (1500 G) and a coercive force Hc of 135 to 276 kA/m (1700 to 3500 Oe).

Next, the process for producing the ferrite particles according to the present invention is described.

The ferrite particles of the present invention can be produced by blending and mixing raw particles at a predetermined mixing ratio; calcining the resultant mixed raw particles at a temperature of 1000 to 1250° C. in atmospheric air, followed by pulverization and washing with water; and then subjecting the resultant particles to annealing treatment at a temperature of 700 to 1100° C. in atmospheric air.

The raw particles may be appropriately selected from particles of oxides, hydroxides, carbonates, nitrates, sulfates, chlorides, etc., of various metals capable of forming a magnetoplumbite-type ferrite. Meanwhile, from the standpoint of improving a reactivity of the raw particles upon calcining, the particle diameter of the raw particles is preferably not more than 2.0 μm.

In addition, in the present invention, the mixed raw particles are preferably calcined by adding a flux thereto. As the flux, there may be used various fluxes. Examples of the flux include $SrCl_2 \cdot 2H_2O$, $CaCl_2 \cdot 2H_2O$, $MgCl_2$, $KCl$, $NaCl$, $BaCl_2 \cdot 2H_2O$ and $Na_2B_4O_7$. The amount of the respective fluxes added is 0.1 to 10% by weight on the basis of the weight of the mixed raw particles, and the amount of $Na_2B_4O_7$ added is preferably not more than 2.0% by weight.

Also, in the present invention, $Bi_2O_3$ may be added to and mixed in the mixed raw particles or the particles obtained by calcining and then pulverizing the raw particles.

In the present invention, various methods so as to obtain ferrite particles having the above particle diameter distribution and volume-average particle diameter can be used. There are exemplified (1) a method comprising mixing two or more ferrite particles having different particle diameter distribution and volume-average particle diameter in a specific amount so as to attain the above particle diameter distribution and volume-average particle diameter; (2) a method comprising selecting particle diameter distribution and volume-average particle diameter of material particles so as to attain the above particle diameter distribution and volume-average particle diameter and calcining thereof to obtain ferrite particles; (3) a method comprising preparing ferrite particles by milling, classifying, sieving or the like so as to attain the above particle diameter distribution; (4) a method comprising milling and/or sieving material ferrite particles between the steps of pre-firing and annealing-heating treatments so as to attain the above particle diameter distribution; (5) a method comprising selecting and/or combining pulverizers having different pulverizing abilities such as compression pulverizing, impact pulverizing, friction pulverizing, shear pulverizing and spatula stroke pulverizing together with controlling the pulverizing condition so as to attain the above particle diameter distribution; or the like. In view of easy process and improvement of reaction effect of pre-firing and annealing-heating treatments, (1) the method comprising mixing two or more ferrite particles having different particle diameter distribution and volume-average particle diameter in a specific amount so as to attain the above particle diameter distribution and volume-average particle diameter and (5) the method comprising selecting and/or combining pulverizers having different pulverizing abilities are preferred.

Meanwhile, in the present invention, from the standpoint of well controlling the particle size distribution and the volume-average particle diameter, two or more kinds of the raw particles which are different in particle diameter from each other may be mixed together.

Next, the resin composition for bonded magnet using the ferrite particles of the present invention is described.

The resin composition for bonded magnet according to the present invention can be produced by mixing and kneading the ferrite particles with an organic binder component and a silane coupling agent component such that the amount of the ferrite particles contained in the resin composition for bonded magnet is 85 to 93% by weight, and the total amount of the organic binder component and the silane coupling agent component contained in the resin composition for bonded magnet is 7 to 15% by weight. When the amount of the ferrite particles is less than 85% by weight, the molded product obtained from the resin composition tends to be deteriorated in surface magnetic force. When the amount of the ferrite particles is more than 93% by weight, the molded product obtained from the resin composition tends to be deteriorated in strength.

The organic binder used in the present invention is not particularly limited as long as it is used in conventional bonded magnets. The organic binder usable in the present invention may be appropriately selected from rubbers, vinyl chloride resins, ethylene-vinyl acetate copolymer resins, ethylene-ethyl acrylate copolymer resins, PPS resins, polyamide (nylon) resins, polyamide elastomers and polymeric aliphatic acid-based polyamides according to the applications thereof. Among these organic binders, in the case where it is intended to preferentially achieve good strength and rigidity of the resultant molded product, the polyamide resins can be suitably used. In addition, if required, a known mold release agent such as zinc stearate and calcium stearate may be added to the organic binder.

As the silane coupling agent, there may be used those silane coupling agents containing, as functional groups, any one of a vinyl group, an epoxy group, an amino group, a methacryl group and a mercapto group, as well as any one of a methoxy group and an ethoxy group. Among these silane coupling agents, preferred are those containing an amino group and a methoxy group or those containing an amino group and an ethoxy group.

The resin composition for bonded magnet according to the present invention has a residual magnetic flux density Br of preferably not less than 230 mT (2300 G) and more preferably not less than 235 mT (2350 G), a coercive force iHc of preferably 119 to 279 kA/m (1500 to 3500 Oe) and more preferably 127 to 259 kA/m (1600 to 3250 Oe), and a maximum energy product BHmax of preferably not less than 10.3 kJ/m$^3$ (1.30 MGOe) and more preferably not less than 10.7 kJ/m$^3$ (1.35 MGOe), as measured by the below-mentioned methods for measuring magnetic properties.

Next, the process for producing the resin composition for bonded magnet by using the ferrite particles, the resin binder and the silane coupling agent according to the present invention is described.

The resin composition for bonded magnet according to the present invention may be produced by any suitable known processes used for producing the conventional resin compositions for bonded magnet. For example, the silane coupling agent is added to and uniformly mixed in the ferrite particles of the present invention, and then the organic binder component is further uniformly mixed in the resultant mixture. Thereafter, the mixture is melted and kneaded using a kneading extruder, etc., and the resultant kneaded material is pulverized or cut into granules or pellets.

The amount of the silane coupling agent added is 0.15 to 3.5 parts by weight and preferably 0.2 to 3.0 parts by weight on the basis of 100 parts by weight of the ferrite particles of the present invention.

Next, the magnet roll of the present invention is described.

The magnet roll may be produced by the following method. That is, the ferrite particles for bonded magnet, the organic binder component, etc., are previously uniformly mixed with each other, or melted and kneaded after mixed together, and then pulverized or cut into pellets to prepare a resin composition for bonded magnet. The resultant resin composition is injected while being kept in a molten state into a cavity of a metal mold in a magnetic field to magnetically orient the magnetic particles contained therein by a so-called magnetic field injection molding method, thereby obtaining a molded product constituted from a body portion of a cylindrical shape having a plurality of magnetic poles on a peripheral surface thereof, and shaft portions integrally formed on both end faces of the body portion. Meanwhile, the obtained molded product is in the form of an integral molded product including a barrel portion having a diameter of 13.6 mm and a length of 220 mm, and shaft portions having a diameter of 5.4 mm which are formed on both end faces of the barrel portion (a center axis of each shaft portion is aligned with that of the barrel portion having a diameter of 13.6 mm).

<Effects>

The reason why the molded product produced from the ferrite particles and/or the resin composition for bonded magnet according to the present invention can exhibit excellent strength and magnetic properties by controlling the volume average particle diameter of the ferrite particles to 2.1 to 2.7 μm and controlling the particle diameter ×90 thereof (wherein the ×90 represents a particle diameter at which a cumulative percentage of the particles under sieve (undersize particles) based on a volume thereof is 90%) to 4.3 to 5.4 μm, is considered by the present inventors as follows, although not clearly known yet.

That is, it is suggested that the dispersing condition of the ferrite particles of the present invention in the organic binder is ideally excellent by controlling the volume-average particle diameter of the ferrite particles to 2.1 to 2.7 μm and controlling the particle diameter ×90 thereof (wherein the ×90 represents a particle diameter at which a cumulative percentage of the particles under sieve (undersize particles) based on a volume thereof is 90%) to 4.3 to 5.4 μm.

In the present invention, the volume-average particle diameter of the ferrite particles at which a cumulative percentage of particles under sieve (undersize particles) based on a volume thereof is 50%, is well controlled to the above specified range, so that the dispersing condition of the ferrite particles can be evaluated more accurately as compared to the control using the number-based particle size distribution ×50. Therefore, the bonded magnet molded product obtained by using the ferrite particles of the present invention can exhibit an ideal dispersing condition and filling condition, resulting in excellent uniformity of surface magnetic force.

In addition, it is suggested by the present inventors that by controlling the particle diameter at which a cumulative percentage of particles under sieve (undersize particles)

based on a volume thereof is 90%, it is possible to minimize presence of coarse particles inhibiting the ferrite particles from being well dispersed.

It is suggested that since the resin composition for bonded magnet according to the present invention contains 85 to 93% by weight of the ferrite particles for bonded magnet and 7 to 15% by weight of the organic binder component, the ferrite particles and the organic binder can be allowed to be present under uniform and ideal dispersed and filled conditions.

The ferrite particles for bonded magnet according to the present invention which have a volume-average particle diameter of 2.1 to 2.7 µm and a particle diameter ×90 of 4.3 to 5.4 µm (wherein the ×90 represents a particle diameter at which a cumulative percentage of particles under sieve (undersize particles) based on a volume thereof is 90%), when determined from a particle size distribution thereof measured by using a laser diffraction type particle size distribution measuring apparatus, are magnetic particles exhibiting an excellent dispersibility in the organic binder, and are, therefore, suitable as magnetic particles for bonded magnet.

The resin composition for bonded magnet according to the present invention which contains the ferrite particles for bonded magnet, the organic binder, the silane coupling agent, etc., is capable of producing a molded product having excellent strength and magnetic properties and is, therefore, suitable as a resin composition for bonded magnet.

The magnet roll of the present invention is excellent in mechanical strength and uniformity of surface magnetic force and exhibits a high surface magnetic force and is, therefore, suitable as a magnet roll for printers, copying machines, etc.

EXAMPLES

Typical examples and embodiments of the present invention are described below.

The volume-average particle diameter, ×90, standard deviation and geometrical standard deviation of the ferrite particles according to the present invention were measured as follows. That is, using a laser diffraction type particle size distribution measuring apparatus "HELOS & RODOS" (type of measuring section: "HELOS/BF-M"; air flow-type dry dispersion unit: "RODOS/M") manufactured by Sympatec GmbH, a sample was dispersed in the "RODOS/M" under a dispersing pressure of 5 bar such that the concentration of the sample at ch. 15 was 5 to 10%, and the measuring condition was controlled in such a normal state that no ghost peak was observed on the side of coarse particles. Then, under the above conditions, the measurement was conducted in the range 1 (0.1/0.18 to 35 µm) by the "HELOS/BF-M".

Meanwhile, the "volume-average particle diameter" means a particle diameter calculated from the volume obtained by dividing a sum of volumes of whole particles by the number of the whole particles, and the "×90" means a particle diameter at which a cumulative percentage of the particles under sieve (undersize particles) based on a volume thereof is 90%. In addition, the "standard deviation" and the "geometrical standard deviation" are determined according to the following formulae.

Meanwhile, as to the "standard deviation" and the "geometrical standard deviation", the reason for adopting the standard deviation is that since the volume-average particle diameter, and the particle diameter of large particles in the particle size distribution, e.g., typically ×90 or ×84, as well as the difference between such a particle diameter and the volume-average particle diameter, are important, the standard deviation as a direct index of these parameters is used to define properties of the particles.

Standard deviation $=(x84-x16)/2$ <Formula 1> wherein ×84 and ×16 represent particle diameters at which cumulative percentages of the particles under sieve (undersize particles) are 84% and 16%, respectively.

Geometrical standard deviation $=(x84/x16)^{1/2}$ <Formula 2> wherein ×84 and ×16 represent particle diameters at which cumulative percentages of the particles under sieve (undersize particles) are 84% and 16%, respectively.

The BET specific surface area of the ferrite particles according to the present invention was measured using a 4 specimen automatic specific surface area analyzer "4 Sorb U2" manufactured by Yuasa Ionics Inc.

The compressed density of the ferrite particles according to the present invention was determined as a density of the particles when compressing the particles under a pressure of 1 t/cm$^2$.

The residual magnetic flux density Br and coercive force iHc of the ferrite particles were determined by molding the ferrite particles under a pressure of 1 t/cm$^2$ and measuring the magnetic properties of the resultant molded product in a magnetic field of 14 kOe using a "D.C. magnetization characteristic automatic recorder 3257" manufactured by Yokogawa Electric Corporation.

The melt mass flow rate (MFR) of the resin composition for bonded magnet was determined by melting the resin composition at 270° C. and measuring the MFR of the molten resin composition under a load of 10 kg, according to JIS K7210.

The density of a molded product (molding density) of the resin composition for bonded magnet was determined as follows. That is, the resin composition for bonded magnet was melted in a cavity of a metal mold having a diameter of 25 mmϕ and a height of 10.5 mm to mold a core, and the density of the core was measured using an electronic specific gravity meter "EW-120SG" manufactured by Yasuda Seiki Seisakusho Ltd.

The water content in the resin composition for bonded magnet was measured using a trace water content analyzer "AQ-7" manufactured by Hiranuma Sangyo Co., Ltd., equipped with a water vaporization device "EV-6" manufactured by Hiranuma Sangyo Co., Ltd.

The magnetic properties of the resin composition for bonded magnet (including residual magnetic flux density Br, coercive force iHc, bHc and maximum energy product BHmax) were determined as follows. That is, the resin composition for bonded magnet was melted in a cavity of a metal mold having a diameter of 25 mmϕ and a height of 10.5 mm and magnetically oriented in a magnetic field of 4 kOe, and then the magnetic properties of the molten resin composition were measured in a magnetic field of 14 kOe using a "D.C. magnetization characteristic automatic recorder 3257" manufactured by Yokogawa Electric Corporation.

The injection moldability of the resin composition for bonded magnet was evaluated as follows. That is, the resin composition was molded using an injection molding machine "110ELII" manufactured by Japan Steel Works, Ltd. to produce an integrally molded magnet roll constituted from a barrel portion having a diameter of 13.6 mm and a length of 220 mm and shaft portions having a diameter of 5.4 mm which were formed on both end faces of the barrel portion (a center axis of each shaft portion is aligned with that of the barrel portion having a diameter of 13.6 mm). The thus produced magnet roll was magnetized in the injection molding machine to form 4 magnetic poles S1, S2, N1 and N2 on the barrel portion, cooled in the metal mold set to 100° C. until the temperature of the surface of the magnet roll was reduced to about 130° C., and then taken out of the metal mold. The injection pressures upon injection-molding the magnet roll were recorded to evaluate the injection moldability of the resin composition.

The mechanical strength of the magnet roll was determined as follows. That is, after molded, the magnet roll was allowed to stand at room temperature (23° C.) and a humidity of 53% for 48 hr, and then subjected to measurement of a three-point bending strength at a barrel portion thereof (i.e., a three-point bending test in which a pressure is applied to a center of a specimen held by setting a distance between the supports to 180 mm, at a rate of 50 mm/min) using an autograph "AG-I Series" manufactured by Shimadzu Corporation. The thus measured bending strength was regarded as the mechanical strength of the magnet roll.

The magnetic properties of the magnet roll were determined as follows. That is, after molded, the magnet roll was allowed to stand at room temperature (23° C.) and a humidity of 53% for 24 hr, and then subjected to measurement of a magnetic flux density at a position spaced by a distance of 8 mm from a center axis thereof using a gauss meter "Model 19951 Gauss Meter" (manufactured by Bell Corp.) equipped with an axial probe "SAF99-1802" manufactured by Toyo Technica Co., Ltd.

The magnetic force of the magnet roll was determined as follow. That is, maximum magnetic flux densities of S1, S2, N1 and N2 were measured at a center of the barrel portion, and the magnetic force was determined as an average value of the measured magnetic flux densities of the four magnetic poles.

The uniformity of the surface magnetic force of the magnet roll was determined by the method as described in Japanese Patent Application Laid-open (KOKAI) No. 10-340002 (1998). That is, the axial magnetic force on the S1 pole was measured in a central portion of the magnet roll extending over the range of 198 mm except for its end portions extending by a distance of 11 mm from each end thereof, at intervals of 1 mm, and the maximum value of change in magnetic flux density as measured at intervals of 1 mm was determined as the uniformity of surface magnetic force.

Example 1

<Production of Ferrite Particles>

25550 g of α-$Fe_2O_3$ particles and 4000 g of $SrCO_3$ (molar ratio between Fe and Sr: 2Fe:Sr=5.91:1) were weighed and mixed with each other by a wet attritor for 30 min, and then the resultant mixture was filtered and dried. A mixed aqueous solution of $BaCl_2.2H_2O$ and $Na_2B_4O_7$ was added to the obtained mixed raw particles and intimately mixed with each other, and then the resultant mixture was granulated. At this time, the amounts of $BaCl_2.2H_2O$ and $Na_2B_4O_7$ added were 1.7% by weight and 0.07% by weight, respectively, on the basis of the weight of the mixed raw particles. The thus obtained granulated product was calcined at 1170° C. for 2 hr in atmospheric air. The thus obtained calcined product was coarsely crushed and then pulverized using a wet attritor for 30 min, followed by washing with water, filtration and drying. Thereafter, 0.06 parts by weight of ethanol and 0.06 part by weight of triethanol amine were added to the resultant particles, and the mixture was further pulverized by a vibration mill for 30 min. Next, the resultant pulverized product was subjected to heat treatment at 950° C. for 1.5 hr in atmospheric air.

As a result, it was confirmed that the resultant ferrite particles had a volume-average particle diameter of 2.27 μm, ×90 of 4.93 μm, a standard deviation of 1.74, a geometrical standard deviation of 2.58, a compressed density CD of 3.46 g/cm³, a residual magnetic flux density Br of 188 mT (1880 G) and a coercive force iHc of 224.5 kA/m (2820 Oe).

Examples 2 to 5 and Comparative Examples 1 to 5

The same procedure as defined in Example 1 was conducted except that the composition, the kinds and amounts of additives, etc., were variously varied, thereby producing ferrite particles.

The ferrite magnetic particles used are shown in Table 1, and production conditions and properties of the obtained ferrite magnetic particles for bonded magnet are shown in Table 2.

Meanwhile, the ferrite particles obtained in Comparative Example 1 had a volume-average particle diameter of 2.78 μm, ×90 of 5.41 μm, a standard deviation of 1.87 and a geometrical standard deviation of 2.30.

Example 6

<Production of Resin Composition for Bonded Magnet>

25000 g of the resultant ferrite particles were charged into a Henschel mixer, and an aminoalkyl-based silane coupling agent was added thereto in an amount of 0.5% by weight based on the weight of the ferrite particles and mixed with each other for 1 hr until a uniform mixture was obtained. In addition, 2727 g of a 6-nylon resin for a plastic magnet having a relative viscosity of 2.02 was charged into the resultant mixture and further mixed with each other for 1 hr, thereby preparing a mixture of a resin composition for bonded magnet.

The resultant mixture of the resin composition for bonded magnet was fed at a constant rate into a twin-screw kneader and kneaded therein at a temperature capable of melting the 6-nylon resin. The kneaded material was extruded from the kneader in the form of strands, and cut into pellets having a size of 2 mmφ×3 mm, thereby obtaining a resin composition for bonded magnet in the form of pellets. As a result, it was confirmed that the resultant resin composition for bonded magnet in the form of pellets had a MFR of 72 g/10 min, a molding density of 3.80 g/cm³, a residual magnetic flux density of 288 mT (2880 G), a coercive force bHc of 183.9 kA/m (2310 Oe), a coercive force iHc of 220.5 kA/m (2770 Oe) and a maximum energy product BHmax of 16.40 kJ/m³ (2.06 MGOe).

Examples 7 to 10 and Comparative Examples 6 to 10

The same procedure as defined in Example 6 was conducted except that the ferrite particles used were variously varied, thereby obtaining resin compositions for bonded magnet.

The kinds of the ferrite particles used and properties of the obtained resin compositions for bonded magnet are shown in Table 3.

Example 11

<Molding of Magnet Roll>

The resin composition for magnet roll obtained in Example 6 was dried at 120° C. for 8 hr, melted at 300° C. in an injection molding machine, and injection-molded into a metal mold set to 100° C. for an injecting time of 1 sec, thereby preparing an integrally molded magnet roll constituted from a barrel portion having a diameter of 13.6 mm and a length of 220 mm and shaft portions formed on both end faces of the barrel portion which had a diameter of 5.4 mm (a center axis of each shaft portion was aligned with that of the barrel portion having a diameter of 13.6 mm). As a result, it was confirmed that the resultant magnet roll had a magnetic force of 82.4 mT (824 G) and a uniformity of a surface magnetic force of 0.47 mT (4.7 G). Further, since the value obtained by dividing the uniformity of surface magnetic force by the magnetic force was 0.57%, it was confirmed that the magnet roll was excellent in uniformity of surface magnetic force. In addition, the magnet roll had a bending strength of 984 N and, therefore, exhibited a sufficient strength. As a result of observing the condition of voids in a section of the magnet roll cut along an axial direction thereof, a number of small voids having a diameter of about 1 mm were present on the section. Therefore, it was confirmed that formation of large voids having a diameter reaching several millimeters were well suppressed. Thus, it is considered that the reason why the magnet roll exhibited an excellent uniformity of surface magnetic force is that the magnet roll was inhibited from being deteriorated in surface magnetic force owing to formation of such large voids. In addition, it is considered that since the voids formed in the magnet roll were fine, the magnet roll is especially effective as such a magnet roll having a small diameter (as small as not more than 13.6 mm) in which the existence of large voids has a close relation to deterioration in uniformity of surface magnetic force thereof.

Examples 12 to 15 and Comparative Examples 11 to 15

The same procedure as defined in Example 11 was conducted except that various resin compositions for bonded magnet were used, thereby producing magnet rolls. Injection moldability and various properties of the obtained magnet rolls are shown in Table 4.

Example 16

Two types of commercial available ferrite particles: Sr ferrite particles having volume-average particle diameters of 3.69 μm (2Fe/Sr=5.98, Sr ferrite particles (1)) and Sr ferrite particles having volume-average particle diameters of 0.98 μm (2Fe/Sr=5.96, Sr ferrite particles (2)), respectively were used. 80 parts by weight of the Sr ferrite particles (1) and 20 parts by weight of the Sr ferrite particles (2) were mixed by use of Henschel mixer.

As a result, it was confirmed that the resultant ferrite particles had a volume-average particle diameter of 2.44 μm, ×90 of 4.94 μm, a standard deviation of 1.65, a BET specific surface area of 1.64 m$^3$/g, a compressed density CD of 3.36 g/cm$^3$, a residual magnetic flux density Br of 180 mT (1800 G) and a coercive force iHc of 230.8 kA/m (2900 Oe).

Example 17

The same procedure as defined in Example 6 was conducted except that the ferrite particles prepared in Example 16 were used, thereby obtaining a resin composition for bonded magnet. The As a result, it was confirmed that the resultant resin composition for bonded magnet in the form of pellets had a MFR of 70 g/10 min, a molding density of 3.79 g/m$^3$, a water content of 88 ppm, a residual magnetic flux density of 285 mT (2850 G), a coercive force bHc of 183.9 kA/m (2310 Oe), a coercive force iHc of 220.5 kA/m (2770 Oe) and a maximum energy product BHmax of 16.32 kJ/m$^3$ (2.05 MGOe).

Example 18

The same procedure as defined in Example 11 was conducted except that the resin composition for bonded magnet prepared in Example 17 was used, thereby producing magnet rolls. The injecting pressure was 123 MPa.

As a result, it was confirmed that the resultant magnet roll had a magnetic force of 81.8 mT (818 G) and a uniformity of a surface magnetic force of 0.45 mT (4.5 G). Further, since the value obtained by dividing the uniformity of surface magnetic force by the magnetic force was 0.55%, it was confirmed that the magnet roll was excellent in uniformity of surface magnetic force. In addition, the magnet roll had a bending strength of 980 N and, therefore, exhibited a sufficient strength.

TABLE 1

| Examples and Comparative Examples | Production of ferrite particles | | | |
|---|---|---|---|---|
| | Raw material for Fe | | Raw material for Sr | |
| | Kind | Amount (g) | Kind | Amount (g) |
| Example 1 | α-Fe$_2$O$_3$ | 25550 | SrCO$_3$ | 4000 |
| Example 2 | α-Fe$_2$O$_3$ | 25550 | SrCO$_3$ | 4000 |
| Example 3 | α-Fe$_2$O$_3$ | 25550 | SrCO$_3$ | 3942 |
| Example 4 | α-Fe$_2$O$_3$ | 25550 | SrCO$_3$ | 3942 |
| Example 5 | α-FeOOH | 28432 | SrCO$_3$ | 4000 |
| Comparative Example 1 | α-Fe$_2$O$_3$ | 25550 | SrCO$_3$ | 4000 |
| Comparative Example 2 | α-Fe$_2$O$_3$ | 25550 | SrCO$_3$ | 4000 |
| Comparative Example 3 | α-Fe$_2$O$_3$ | 25550 | SrCO$_3$ | 3942 |
| Comparative Example 4 | α-Fe$_2$O$_3$ | 25550 | SrCO$_3$ | 3942 |
| Comparative Example 5 | α-Fe$_2$O$_3$ | 25550 | SrCO$_3$ | 4000 |

| Examples and Comparative Examples | Production of ferrite particles | | |
|---|---|---|---|
| | 2Fe/Sr Molar ratio | BaCl$_2$•2H$_2$O | |
| | (—) | Amount (g) | (wt %) |
| Example 1 | 5.91 | 500 | 1.7 |
| Example 2 | 5.91 | 500 | 1.7 |
| Example 3 | 5.99 | 900 | 3.1 |
| Example 4 | 5.99 | 700 | 2.4 |
| Example 5 | 5.91 | 300 | 0.9 |
| Comparative Example 1 | 5.91 | 900 | 3.0 |
| Comparative Example 2 | 5.91 | 300 | 1.0 |
| Comparative Example 3 | 5.99 | 700 | 2.4 |
| Comparative Example 4 | 5.99 | 300 | 1.0 |
| Comparative Example 5 | 5.91 | 300 | 1.0 |

| Examples and Comparative Examples | Production of ferrite particles | | Calcining temperature (° C.) |
|---|---|---|---|
| | Na$_2$B$_4$O$_7$ | | |
| | Amount added (g) | (wt %) | |
| Example 1 | 20 | 0.07 | 1170 |
| Example 2 | 0 | — | 1180 |
| Example 3 | 60 | 0.20 | 1200 |

TABLE 1-continued

| | | | |
|---|---|---|---|
| Example 4 | 0 | — | 1170 |
| Example 5 | 20 | 0.06 | 1170 |
| Comparative Example 1 | 60 | 0.20 | 1200 |
| Comparative Example 2 | 20 | 0.07 | 1200 |
| Comparative Example 3 | 60 | 0.20 | 1200 |
| Comparative Example 4 | 0 | — | 1170 |
| Comparative Example 5 | 0 | — | 1170 |

TABLE 2

| Examples and Comparative Examples | Magnetic properties | | | |
|---|---|---|---|---|
| | Br | | iHc | |
| | mT | G | kA/m | Oe |
| Example 1 | 188 | 1880 | 224.5 | 2820 |
| Example 2 | 184 | 1840 | 215.0 | 2700 |
| Example 3 | 184 | 1840 | 212.6 | 2670 |
| Example 4 | 182 | 1820 | 220.5 | 2770 |
| Example 5 | 183 | 1830 | 216.6 | 2720 |
| Example 16 | 180 | 1800 | 230.8 | 2900 |
| Comparative Example 1 | 183 | 1830 | 199.8 | 2510 |
| Comparative Example 2 | 185 | 1850 | 210.2 | 2640 |
| Comparative Example 3 | 186 | 1860 | 216.6 | 2720 |
| Comparative Example 4 | 182 | 1820 | 251.6 | 3160 |
| Comparative Example 5 | 179 | 1790 | 236.5 | 2970 |

| Examples and Comparative Examples | Properties of ferrite particles | | | | |
|---|---|---|---|---|---|
| | BET (m²/g) | CD (g/cm³) | Volume-average particle diameter (μm) | x90 (μm) | Standard deviation (—) |
| Example 1 | 1.89 | 3.46 | 2.27 | 4.93 | 1.74 |
| Example 2 | 1.60 | 3.37 | 2.46 | 4.88 | 1.69 |
| Example 3 | 1.40 | 3.41 | 2.64 | 5.30 | 1.87 |
| Example 4 | 1.82 | 3.36 | 2.24 | 4.42 | 1.49 |
| Example 5 | 1.75 | 3.36 | 2.35 | 4.67 | 1.59 |
| Example 16 | 1.64 | 3.36 | 2.44 | 4.94 | 1.65 |
| Comparative Example 1 | 1.34 | 3.39 | 2.78 | 5.41 | 1.87 |
| Comparative Example 2 | 1.59 | 3.44 | 2.66 | 5.60 | 2.00 |
| Comparative Example 3 | 1.45 | 3.44 | 2.75 | 5.79 | 2.03 |
| Comparative Example 4 | 2.20 | 3.42 | 2.04 | 4.26 | 1.48 |
| Comparative Example 5 | 1.52 | 3.31 | 2.24 | 4.15 | 1.35 |

TABLE 3

| Examples and Comparative Examples | Kind of ferrite | Properties of resin composition for bonded magnet | | |
|---|---|---|---|---|
| | | MFR (g/10 min) | Molding density (g/cm³) | Water content (ppm) |
| Example 6 | Example 1 | 72 | 3.80 | 110 |
| Example 7 | Example 2 | 64 | 3.78 | 56 |
| Example 8 | Example 3 | 73 | 3.79 | 78 |
| Example 9 | Example 4 | 61 | 3.79 | 191 |
| Example 10 | Example 5 | 62 | 3.80 | 88 |
| Example 17 | Example 16 | 70 | 3.79 | 88 |
| Comparative Example 6 | Comparative Example 1 | 62 | 3.79 | 108 |
| Comparative Example 7 | Comparative Example 2 | 83 | 3.77 | 89 |
| Comparative Example 8 | Comparative Example 3 | 70 | 3.79 | 65 |
| Comparative Example 9 | Comparative Example 4 | 63 | 3.79 | 92 |
| Comparative Example 10 | Comparative Example 5 | 51 | 3.78 | 102 |

| Examples and Comparative Examples | Properties of resin composition for bonded magnet | | | |
|---|---|---|---|---|
| | Br | | bHc | |
| | mT | G | kA/m | Oe |
| Example 6 | 288 | 2880 | 183.9 | 2310 |
| Example 7 | 294 | 2940 | 180.7 | 2270 |
| Example 8 | 297 | 2970 | 180.7 | 2270 |
| Example 9 | 287 | 2630 | 183.9 | 2310 |
| Example 10 | 285 | 2850 | 184.7 | 2320 |
| Example 17 | 285 | 2850 | 183.9 | 2310 |
| Comparative Example 6 | 292 | 2920 | 160.8 | 2020 |
| Comparative Example 7 | 295 | 2950 | 177.5 | 2230 |
| Comparative Example 8 | 295 | 2950 | 179.1 | 2250 |
| Comparative Example 9 | 284 | 2840 | 203.0 | 2550 |
| Comparative Example 10 | 282 | 2820 | 191.9 | 2410 |

| Examples and Comparative Examples | Properties of resin composition for bonded magnet | | | |
|---|---|---|---|---|
| | iHc | | BHmax | |
| | kA/m | Oe | kJ/m³ | MGOe |
| Example 6 | 220.5 | 2770 | 16.40 | 2.06 |
| Example 7 | 200.6 | 2520 | 16.88 | 2.12 |
| Example 8 | 201.4 | 2530 | 17.36 | 2.18 |
| Example 9 | 209.4 | 2830 | 16.08 | 2.02 |
| Example 10 | 215.8 | 2710 | 15.76 | 1.98 |
| Example 17 | 220.5 | 2770 | 16.32 | 2.05 |
| Comparative Example 6 | 176.0 | 2210 | 16.72 | 2.10 |
| Comparative Example 7 | 197.5 | 2480 | 17.04 | 2.14 |
| Comparative Example 8 | 204.6 | 2570 | 17.04 | 2.14 |
| Comparative Example 9 | 243.6 | 3080 | 15.76 | 1.98 |
| Comparative Example 10 | 230.9 | 2900 | 15.37 | 1.93 |

TABLE 4

| Examples and Comparative Examples | Kind of compound (composition for bonded magnet) | Injection moldability Injecting pressure (MPa) |
|---|---|---|
| Example 11 | Example 6 | 117 |
| Example 12 | Example 7 | 103 |
| Example 13 | Example 8 | 137 |
| Example 14 | Example 9 | 120 |
| Example 15 | Example 10 | 117 |
| Example 18 | Example 17 | 123 |

TABLE 4-continued

| | | |
|---|---|---|
| Comparative Example 11 | Comparative Example 6 | 119 |
| Comparative Example 12 | Comparative Example 7 | 80 |
| Comparative Example 13 | Comparative Example 8 | 100 |
| Comparative Example 14 | Comparative Example 9 | 126 |
| Comparative Example 15 | Comparative Example 10 | 136 |

| Examples and Comparative Examples | Properties of magnet roll | | | |
|---|---|---|---|---|
| | Magnetic force | | Uniformity of surface magnetic force | |
| | mT | G | mT | G |
| Example 11 | 82.4 | 824 | 0.47 | 4.7 |
| Example 12 | 80.3 | 803 | 0.46 | 4.6 |
| Example 13 | 80.0 | 800 | 0.45 | 4.5 |
| Example 14 | 79.6 | 796 | 0.42 | 4.2 |
| Example 15 | 80.3 | 803 | 0.44 | 4.4 |
| Example 18 | 81.8 | 818 | 0.45 | 4.5 |
| Comparative Example 11 | 83.5 | 835 | 0.81 | 8.1 |
| Comparative Example 12 | 80.4 | 804 | 0.75 | 7.5 |
| Comparative Example 13 | 80.4 | 804 | 0.67 | 6.7 |
| Comparative Example 14 | 77.8 | 778 | 1.21 | 12.1 |
| Comparative Example 15 | 77.2 | 772 | 0.98 | 9.8 |

| Examples and Comparative Examples | Properties of magnet roll | |
|---|---|---|
| | Uniformity of surface magnetic force/magnetic force (%) | Bending strength (N) |
| Example 11 | 0.57 | 984 |
| Example 12 | 0.57 | 964 |
| Example 13 | 0.56 | 984 |
| Example 14 | 0.53 | 1035 |
| Example 15 | 0.55 | 1028 |
| Example 18 | 0.55 | 980 |
| Comparative Example 11 | 0.97 | 421 |
| Comparative Example 12 | 0.93 | 972 |
| Comparative Example 13 | 0.83 | 963 |
| Comparative Example 14 | 1.56 | 928 |
| Comparative Example 15 | 1.27 | 729 |

Thus, it was confirmed that the magnet roll of the present invention had a strength of not less than 700 N, a magnetic force of not less than 700 G (not less than 70 mT), and a uniformity of surface magnetic force (maximum value of change in magnetic flux density as measured at intervals of 1 mm) of not more than 0.70%, and were, therefore, excellent in properties, in particular, uniformity of surface magnetic force and mechanical strength, as compared to those obtained in Comparative Examples.

Since the bonded magnet obtained by using the ferrite particles and/or the resin composition for bonded magnet according to the present invention are excellent in both bending strength and magnetic properties, the ferrite particles and/or the resin composition according to the present invention are suitable as ferrite particles and/or a resin composition for bonded magnet, in particular, for a magnet roll.

Although the present invention is described above with respect to embodiments which are considered to be most practical and preferable at the present time, in the above technical range described in the present specification, it should be construed that all combinations using any one of values described in the above Examples are possible and are described in the present specification as the modifications of above all limitation range described in the present specification unless departing from the subject matter and concept of the present invention.

What is claimed is:

1. A bonded magnet roll molded from Sr-based and/or Ba-based magnetoplumbite ferrite particles having a volume-average particle diameter of 2.1 to 2.7 μm and a particle diameter x90 of 4.3 to 5.4 μm, wherein the x90 represents a particle diameter at which a cumulative percentage of particles under sieve (undersize particles) based on a volume thereof is 90%, when determined from a particle size distribution thereof measured by using a laser diffraction type particle size distribution measuring apparatus, in an organic binder, wherein:

the Sr-based magnetoplumbite ferrite particles consist of
(i) Sr-based magnetoplumbite ferrite consisting of Sr, Fe and O, and
(ii) at least one compound selected from the group consisting of $Bi_2O_3$ and a residue obtained from calcination of at least one flux selected from the group consisting of $SrCl_2.2H_2O$, $CaCl_2.2H_2O$, $MgCl_2$, KCl, NaCl $Na_2B_4O_7$, and $Bi_2O_3$; and the Ba-based magnetoplumbite ferrite particles consist of
(i) Ba-based magnetoplumbite ferrite consisting of Ba, Fe, and O, and
(ii) at least one compound selected from the group consisting of $Bi_2O_3$ and a residue obtained from calcination of at least one flux selected from the group consisting of $SrCl_2.2H_2O$, $CaCl_2.2H_2O$, $MgCl_2$, KCl, NaCl, $Na_2B_4O_7$, and $Bi_2O_3$.

2. A bonded magnet roll molded from Sr-based and/or Ba-based magnetoplumbite ferrite particles having a volume-average particle diameter of 2.1 to 2.7 μm and a particle diameter x90 of 4.3 to 5.4 μm, wherein the x90 represents a particle diameter at which a cumulative percentage of particles under sieve (undersize particles) based on a volume thereof is 90%, when determined from a particle size distribution thereof measured by using a laser diffraction type particle size distribution measuring apparatus, in an organic binder, wherein:

the Sr-based magnetoplumbite ferrite particles consist of
(i) Sr-based magnetoplumbite ferrite consisting of Sr, Fe, and O; and the Ba-based magnetoplumbite ferrite particles consist of
(i) Ba-based magnetoplumbite ferrite consisting of Ba, Fe and O.

* * * * *